(12) United States Patent
Backhaus-Ricoult

(10) Patent No.: US 7,951,281 B2
(45) Date of Patent: May 31, 2011

(54) METHODS FOR DIMINISHING OR PREVENTING THE DEPOSITION OF A METAL OXIDE ON AN ELECTRODE SURFACE

(75) Inventor: Monika Backhaus-Ricoult, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 406 days.

(21) Appl. No.: 12/156,793

(22) Filed: Jun. 4, 2008

(65) Prior Publication Data

US 2009/0301898 A1 Dec. 10, 2009

(51) Int. Cl.
*C25B 15/02* (2006.01)
*C25C 7/06* (2006.01)

(52) U.S. Cl. ........ 205/350; 429/479; 429/484; 429/485; 429/430; 429/432; 204/424; 204/425

(58) Field of Classification Search ................ 429/479, 429/484, 485, 430, 432; 204/424, 425; 205/350
See application file for complete search history.

(56) References Cited

U.S. PATENT DOCUMENTS

| | | | |
|---|---|---|---|
| 3,964,930 A | 6/1976 | Reiser | 136/86 |
| 7,575,824 B2 * | 8/2009 | Kim et al. | 429/423 |
| 2005/0048356 A1 * | 3/2005 | Ihringer et al. | 429/44 |
| 2005/0142398 A1 * | 6/2005 | Browall et al. | 429/13 |
| 2005/0233187 A1 | 10/2005 | Pastula et al. | 429/13 |
| 2007/0134532 A1 | 6/2007 | Jacobson et al. | 429/32 |
| 2007/0178004 A1 * | 8/2007 | Laatsch et al. | 419/5 |
| 2009/0011323 A1 * | 1/2009 | Guan et al. | 429/41 |
| 2009/0104494 A1 * | 4/2009 | Quadakkers et al. | 429/27 |
| 2009/0232867 A1 * | 9/2009 | Domb et al. | 424/423 |

FOREIGN PATENT DOCUMENTS

| | | |
|---|---|---|
| DE | 10 2005 059 708 | 6/2007 |
| FR | 2590908 | 11/1985 |
| GB | 1211333 | 1/1969 |

OTHER PUBLICATIONS

"Interaction between chromia forming alloy interconnects and air electrode of solid oxide fuel cells"; S.P.S. Badwal et al, Solid State Ionics 99 (1997) 297-310.

"Chromium Poisoning of LSM-YSZ SOFC Cathodes"; S.C. Paulson et al; Journal of the Electrochemical Society, 151 (11) A1961-A1968 (2004).

"Dependence of SOFC Cathode Degradation by Chromium-Containing Alloy on Compositions of Electrodes and Electrolytes"; Yoshio Matsuzaki et al; Journal of the Electrochemical Society, 148 (2) A126-A131 (2001).

Deposition of Cr Species at (La,Sr) (co,Fe) $O_3$ Cathodes of Solid Oxide Fuel Cells; San Ping Jiang et al; Journal of the Electrochemical Society, 153 (1) A127-A134 (2006).

"Chromium Vapor Species over Solid Oxide Fuel Cell Interconnect Materials and their Potential for Degradation Processes"; K. Hilpert et al; J. Electrochem. Soc. vol. 143; No. 11, Nov. 1996; p. 3642-3647.

* cited by examiner

*Primary Examiner* — Bruce F Bell
(74) *Attorney, Agent, or Firm* — Svetlana Z. Short

(57) ABSTRACT

Described herein are methods for diminishing or preventing in electrochemical operating systems the deposition of a metal oxide on an electrode surface. The metal oxide is formed by electrochemically assisted reduction of volatile metal oxides formed from a metallic component exposed to oxidative environments. In one example, described herein are methods for diminishing or preventing poisoning of a cathode by applying a negative protection potential to the metallic component. In another example, described herein are methods for diminishing or preventing the deposition of a metal oxide on a cathode surface by removing oxygen from the metallic component itself and thereby decreasing the amount of released volatile oxide from the metallic component by use of an auxiliary oxygen pump cell. In another example, described herein is a method for diminishing or preventing the formation of volatile suboxides formed from a component composed of an oxide species by reduction in a fuel chamber or reducing environment, which includes applying a positive protection potential to the component.

24 Claims, 15 Drawing Sheets

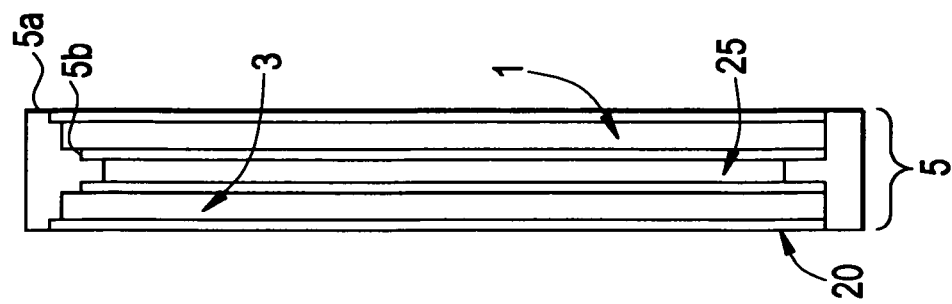
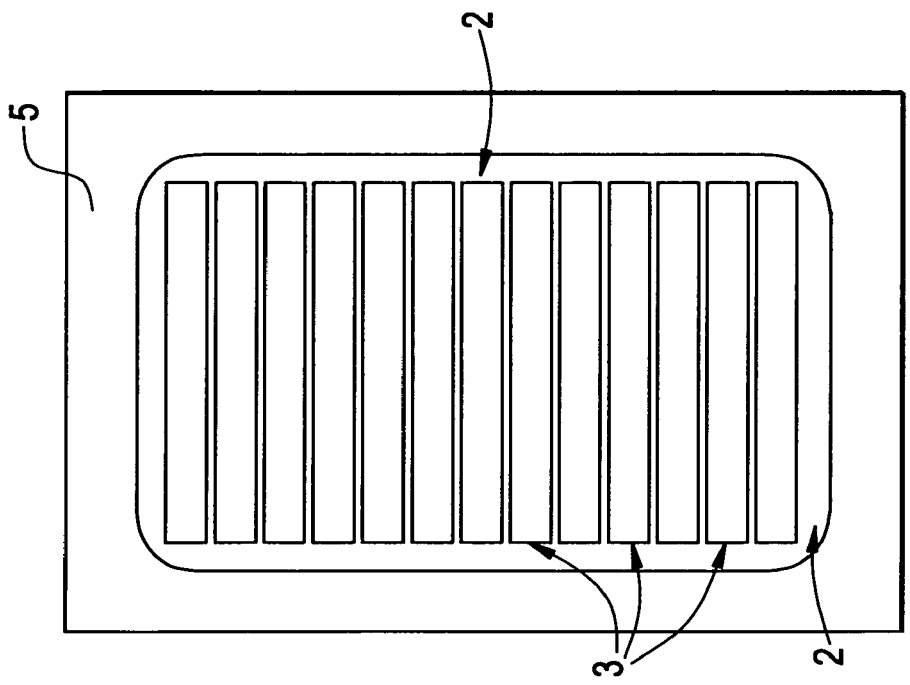
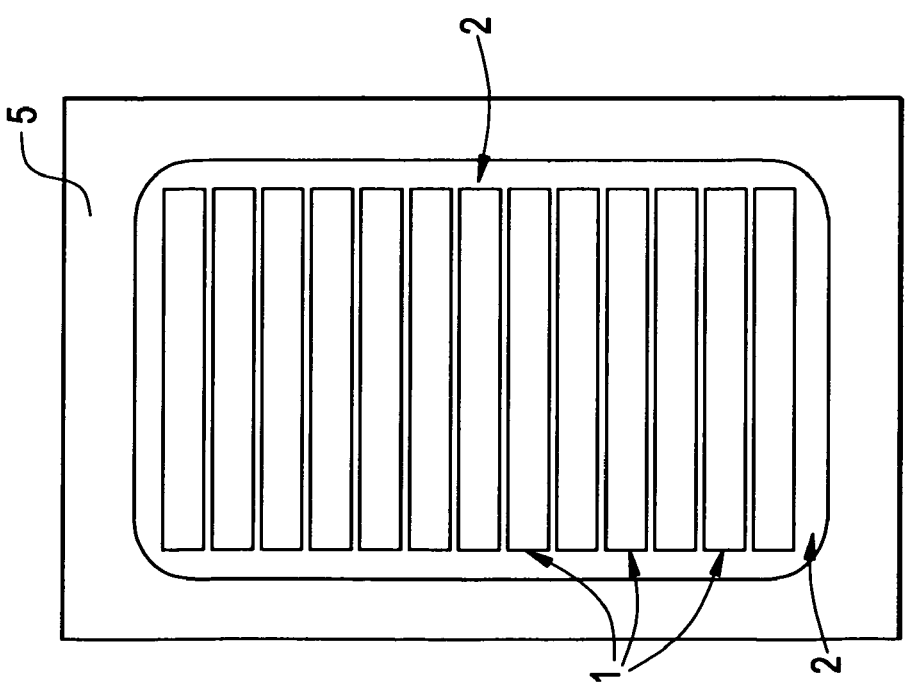

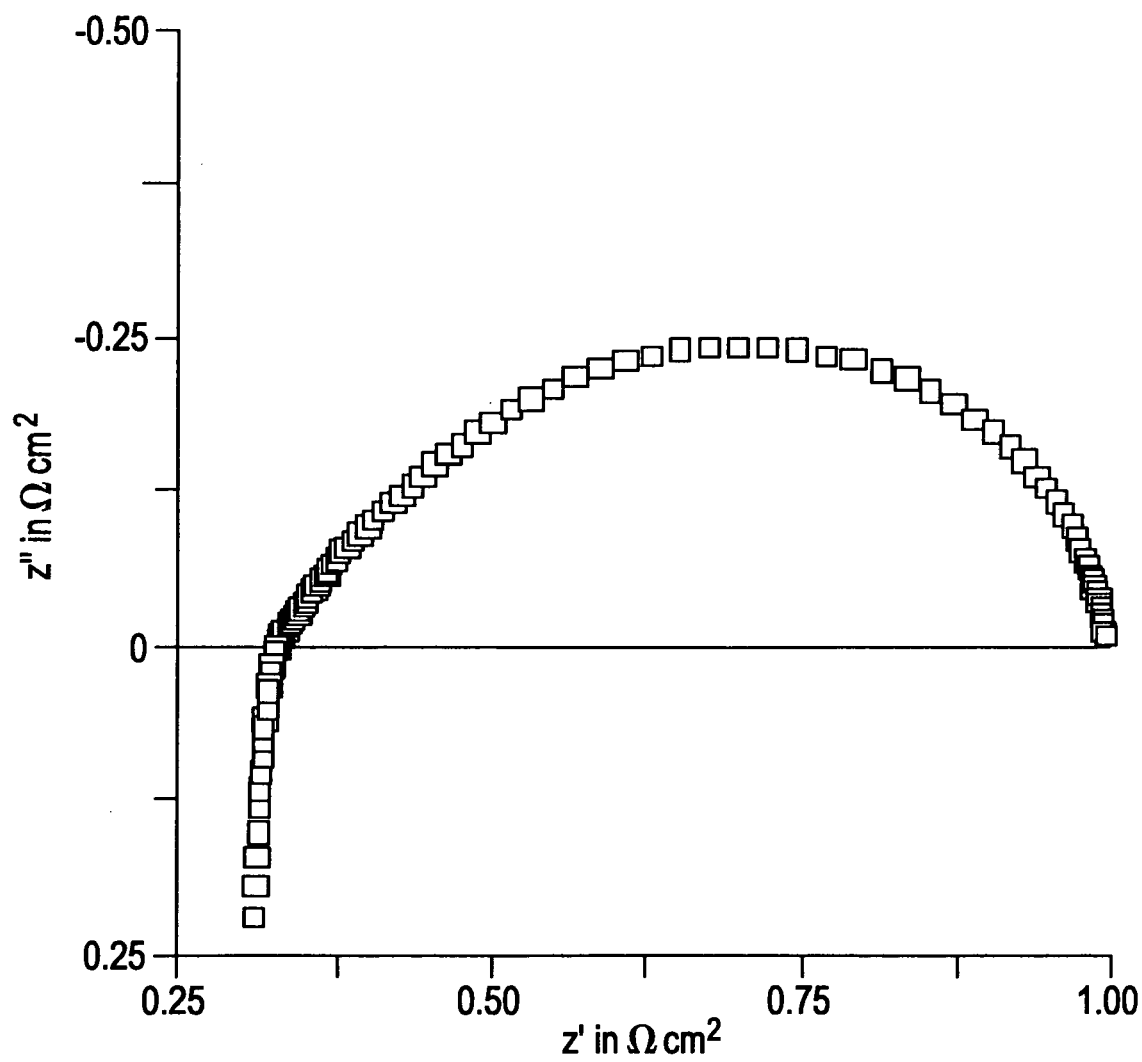

METHODS FOR DIMINISHING OR PREVENTING THE DEPOSITION OF A METAL OXIDE ON AN ELECTRODE SURFACE

BACKGROUND

Solid oxide fuel cells (SOFC) are a promising way to transform fuel into electric energy. However, to date, SOFC technology has proven more inefficient than first believed. A part of this inefficiency may be attributed to cell-inherent impurities or stack(system)-proper pollutants, which lead to "cathode poisoning." For example, one form of cathode poisoning termed "chromium poisoning" plagues SOFC lifetime and efficiency. Particularly, during high temperature SOFC stack operation, chromium present in steels or metallic alloys within the air chamber or gas conducts of the stack is oxidized and forms amongst other oxidized solid compounds volatile Cr(VI) species. Examples of such species include $CrO_3$ and $CrO_2(OH)_2$, which penetrate the entire air chamber including the porous cathodes. As a results of cathode polarization in the SOFC, an electrochemically assisted reduction of the Cr(VI) species occurs in the cathode under production of $Cr_2O_3$, which deposits on the internal pore surfaces of the cathode. This inhibits the oxygen incorporation in the cathode and ultimately degrades the performance of the fuel cell over time. Although chromium poisoning is specifically caused by Cr-containing metals, there also exist other metals that can form volatile oxides in air and penetrate the cathode. There are existing volatile oxides that react in the cathode, form a solid compound with other cell components that can deposit on the inner electrode surfaces in a similar manner, which would also inhibit cathode oxygen exchange.

In an attempt to minimize this problem, steel and other Cr-containing alloys in the SOFC air chamber have been coated with barrier layers. For a short time, such layers slow or even stop chromium oxidation, formation of volatile Cr(VI) species and subsequent cathode poisoning. However, over time chromium may diffuse through the barrier layer and induces chromium poisoning. Therefore, the need to diminish or prevent electrode poisoning persists.

SUMMARY

Described herein are methods for diminishing or preventing in electrochemical operating systems the deposition of a metal oxide on electrode surfaces. The metal oxide is formed by electrochemically assisted reduction or reaction of volatile metal oxides formed from a metallic component exposed to an oxidizing environment. In one example, described herein are methods for diminishing or preventing poisoning of a cathode by applying a negative protection potential to metallic components that contain potential poisoning species. In another example, described herein are methods for diminishing or preventing the deposition of a metal oxide on a cathode surface by keeping the oxygen activity in the metallic component low by continuously removing oxygen by the use of an auxiliary oxygen pump cell and oxygen pump voltage. In another example, described herein is a method for diminishing or preventing the formation of volatile partially reduced metal oxides from a component composed of an oxide species in a fuel chamber or fuel conducts of SOFC or similar devices by applying a positive protection potential to the component.

The methods described herein have an advantage of providing a new approach to diminish or prevent the poisoning of electrodes such as cathodes in SOFC, electrochemical sensors, gas separation cells and similar electrochemical systems. The advantages of the invention will be set forth in part in the description which follows, and in part will be obvious from the description or the claims. It is to be understood that both the foregoing general description and the following detailed description are exemplary and explanatory only and are not restrictive.

BRIEF DESCRIPTION OF THE DRAWINGS

FIG. 1A shows a view of an exemplary 10-cell device on the side of the air chamber with cathodes 1, electrolyte 2, and metal frame 5. FIG. 1B shows a view of the exemplary 10-cell device on the fuel chamber side with the anodes 3. FIG. 1C shows the stack or stack unit made of two 10-cell devices with an enclosed sealed fuel chamber attached to frame 5.

FIGS. 7A and 7B show the characteristics of an exemplary symmetric single cell device when exposed to $Cr_2O_3$ as a source of volatile Cr(VI) species. FIG. 7A shows the impedance without applied bias, with FIG. 7B depicting the current-voltage characteristics.

DETAILED DESCRIPTION

Figure 1D:
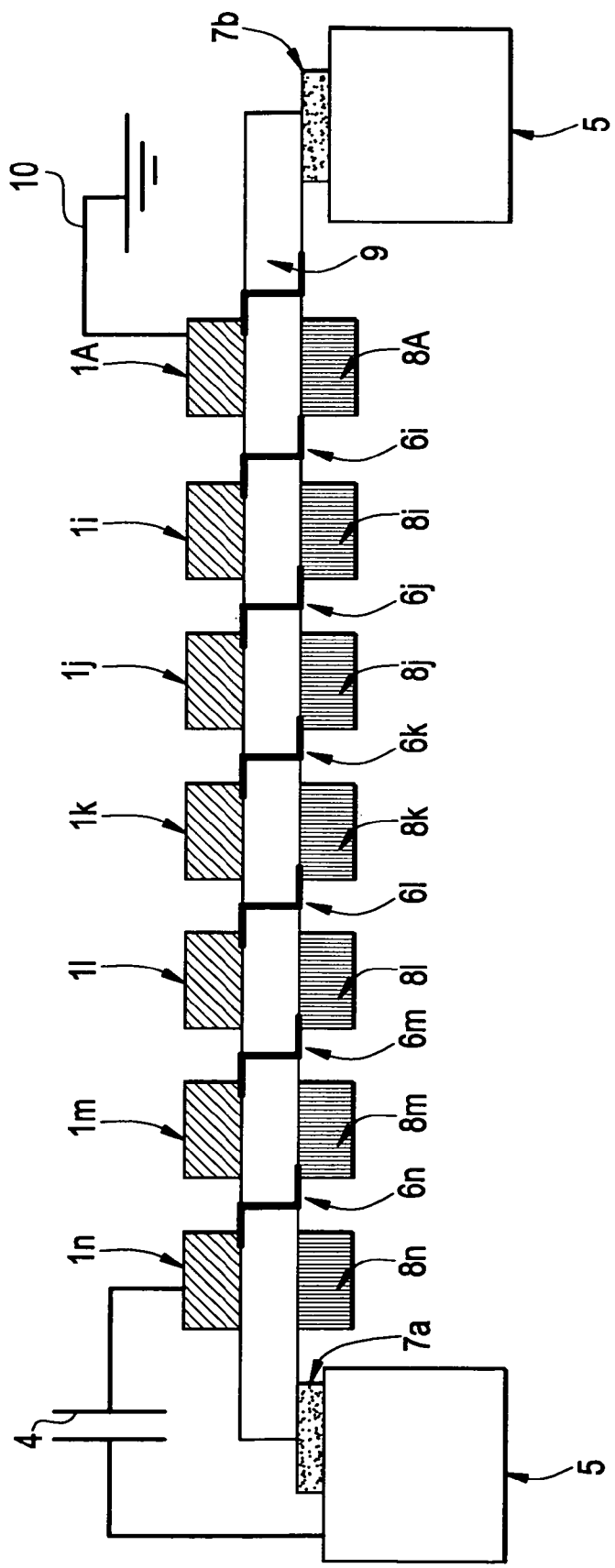
FIG. 1D shows a schematic in which the negative protection potential is applied to a stainless steel frame containing chromium present in a fuel cell. This figure also shows the cross sectional view of the cathodes and anodes in the multicell device.

Before the present compounds, compositions, articles, devices, and/or methods are disclosed and described, it is to be understood that the examples described below are not limited to specific compounds, synthetic methods or uses as such may, of course, vary. It is also to be understood that the terminology used herein is for the purpose of describing particular examples only and is not intended to be limiting.

In this specification and in the claims that follow, reference will be made to a number of terms that shall be defined to have the following meanings:

It must be noted that, as used in the specification and the appended claims, the singular forms "a," "an" and "the" include plural referents unless the context clearly dictates otherwise. Thus, for example, reference to "a metal oxide vapor" includes mixtures of two or more such metal oxide vapors, and the like.

"Optional" or "optionally" means that the subsequently described event or circumstance can or cannot occur, and that the description includes instances where the event or circumstance occurs and instances where it does not. For example, the phrase "optionally steel" means that the steel may or may not be present.

The present invention will now be described with specific reference to various examples. The following examples are not intended to be limiting of the invention and are rather provided as exemplary embodiments.

Described herein are methods for preventing or diminishing the deposition of metal oxides on electrodes. The term "metallic component" as used herein is defined as a metallic part present in a system, such as a SOFC stack, an electrochemical sensor, gas separation unit, chemical reactor or gas conduct. The term "metal species" is defined as an element present in the metallic component. Depending on the type of metal species, the system operation temperature, and the system operation environment (oxygen content), some metal species can be oxidized and even migrate to the surface of the metallic component and subsequently get oxidized. Some metal species form a volatile metal oxide. Such volatile oxides can penetrate components in the system including, but not limited to, a porous electrode. Some volatile oxides can react with the electrode material and form oxide layers that can block further oxygen exchange in the electrode. In cathodes that suffer polarization during their operation, such volatile oxides can also be partially reduced (e.g., electrochemical assisted reduction) and deposited on the internal cathode surfaces, Examples of metal species that form volatile oxides include, but are not limited to, chromium, tungsten, molybdenum, or any combination thereof. An example of metal species that forms volatile oxides that can be easily reduced to non-volatile oxides include chromium. Examples of metals containing the metal species include, but are not limited to, steel and alloys. In one example, the metallic component is a metal frame for supporting a device, a gas inlet tube, or a metal casing used to host the electrochemical device or any other metallic accessory in the system. For example, the metallic component can be present in the air chamber of the solid oxide fuel cell (SOFC) stack.

In one example, the deposition of a metal oxide on an electrode surface from a volatile metal oxide formed by a metal species present in the metallic component is diminished or prevented by applying a negative protection potential to the metallic component. The term "negative protection potential" is defined herein as a negative potential that when applied to the metallic component prevents or diminishes the amount of metal oxide vapor produced. Thus, the negative protection potential diminishes or prevents the likelihood of poisoning of an electrode by a metal species present in the metallic component. Without wishing to be bound by theory, this negative protection potential may function to limit the oxidation of the metallic component, to lower overall pressure of the volatile metal oxide species, and may even act as a sink for the volatile metal oxide species with high oxidation states. In addition, the negative protection potential may be varied during operation for optimally suppressing poisoning. The negative protection potential can be applied to any metallic component. In one example, the negative protection potential is applied homogenously to every metallic component. In another example, it is applied to a selected metallic component. The negative protection potential is applied as a negative electric potential difference between the metallic component and a cathode with the metallic component being set on a negative potential compared to the electrode.

In one example, the negative protection potential is applied between the metallic component and the cathode in the system that is at the most negative electric potential. For example, if a cathode in the system during operation is at an electric potential of −0.2V compared to ground, then the negative protection potential shall set the metallic component compared to ground to a potential less than −0.2V (e.g., −0.4 V, −0.5 V, −0.6 V etc.). The negative protection potential can be applied as a potential difference between the metallic component and ground of <−0.2V or between the metallic part and that cathode of <0V. In one example, the negative protection potential is applied between the metallic component and the cathode of the circuit that is at the most negative electric potential. In another example, the negative protection potential is applied between the metallic component and any individual cathode. In a further example, the protection potential is applied between the metallic component and a common system ground.

The value of negative protection potential applied to the metallic component is sufficient to reduce the partial pressure of the volatile metal oxide species. In one example, the value of the negative protection potential is sufficient to reduce the partial pressure of the volatile metal oxide species by 50%, more than 50%, more than 70%, or more than 90%. In one example, the negative protection potential difference applied between the metallic component and the cathode in the circuit at the most negative electric potential is at least −0.3 V. In another example, the negative protection potential applied to the metallic component is at least −0.5 V compared to the cathode in the circuit that is at the most negative electric potential. In yet another example, the negative protection potential applied to the metallic component is at least −0.8 V compared to the cathode in the circuit that is at the most negative electric potential.

FIG. 1 depicts one example for applying the negative protection potential to a metallic component. FIG. 1A shows a view of an exemplary 10-cell device on the side of the air chamber with cathodes 1, electrolyte 2, and metal frame 5. FIG. 1B shows a view of the exemplary 10-cell device on the fuel chamber side with the anodes 3. FIG. 1C shows the stack or stack unit made of two 10-cell devices with an enclosed sealed fuel chamber attached to frame 5. FIG. 1D shows the cross sectional view of the cathodes and anodes in the multicell device. The SOFC stack or stack unit as depicted in FIGS. 1A-D is a multicell device with a plurality of cathodes 1 (1A and 1$i$-1$n$ in FIG. 1D) and anodes (8A and 8$i$-8$n$) on an electrolyte sheet (9). A sequential arrangement in the multicell is chosen, where the cathode 1$i$ is interconnected to the anode 8A by via (6$i$). The remaining anodes and cathodes are interconnected by vias 6$j$-6$n$. The electrolyte is mounted on a frame (5). Air and fuel chambers are separated by seals (7$a$ and 7$b$) that are located between electrolyte and frame. Cathodes operate in the air chamber, anodes in the fuel chamber. Part of the frame (5$a$ in FIG. 1C) is exposed to the fuel chamber (25 in FIG. 1C), part of the frame (5$b$ in FIG. 1C) is exposed to the air chamber (20 in FIG. 1C).

Referring to FIG. 1A, cathode 1A is grounded (10 in FIG. 1D, ϕ=0 V). During SOFC operation, power is produced in each cell. At cathode 1$n$, the voltage $\Delta V_n$ is produced so that the corresponding anode is at the electric potential $\phi_n = \Delta V_n$. In the circuit of several consecutive cells in FIG. 1D, where the cathodes are interconnected by vias (6i-6n) to the anodes of the precedent cell, the negative potential builds up over the number of consecutive operating cells (anode and cathode). Since all cells are put in sequence in the operating stack, the final cathode labeled as (1n) in FIG. 1D is at the lowest electric potential $\phi_n = 0 - \Delta V_i - \Delta V_j - \Delta V_k \ldots - \Delta V_n$. A negative protection potential (4) is applied between the frame (2) and cathode 1n. The negative protection potential can be applied by a DC power supply to one metallic component or all of the metallic components homogeneously to prevent or diminish metal oxide vapor formation in the stack housing. Although FIG. 1D depicts grounding cathode 1A for illustration, it is not required to ground that particular cathode. Grounding depends on the system or device utilized and would be readily apparent to one skilled in the art.

In another example, described herein is a method for diminishing or preventing the formation of volatile metal oxides from the metallic component itself. In this example, oxygen is continuously removed from the core of the metallic component at a desired rate to a desired level by an auxiliary oxygen pump cell. The pump cell is composed of an oxygen ion conducting electrolyte such as, for example, YSZ; an electrode composed of the metallic component; and an inert counter electrode surrounded by gas (e.g., air). The auxiliary oxygen pump cell is sealed to the metallic component so not allow oxygen from the gas to penetrate the electrolyte on the cell side with the metallic component. The method involves the application of an oxygen pump voltage between the metallic component (e.g., cathode of the auxiliary pump) and the counter electrode. In this example, oxygen present in the metallic component diffuses to the electrolyte surface, which is then reduced to produce oxygen ions that are subsequently transported through the electrolyte and released in the counter electrode as oxygen gas. Oxygen present in the metallic component can exist as dissolved oxygen or an oxide. The applied oxygen pump voltage pumps oxygen out of the metallic component, and keeps it at a lower oxygen chemical potential. The oxygen pump voltage is also sufficient to limit the oxidation rate of the metallic component, and also inhibit or at least significantly decrease the formation of volatile metal oxide that can ultimately poison the electrode (e.g., volatile $CrO_3$ resulting in SOFC cathode poisoning). The oxygen pump voltage may be applied either continuously or intermittently to the entire metallic component or locally to a particular crucial spot of a metallic component.

Figure 2:
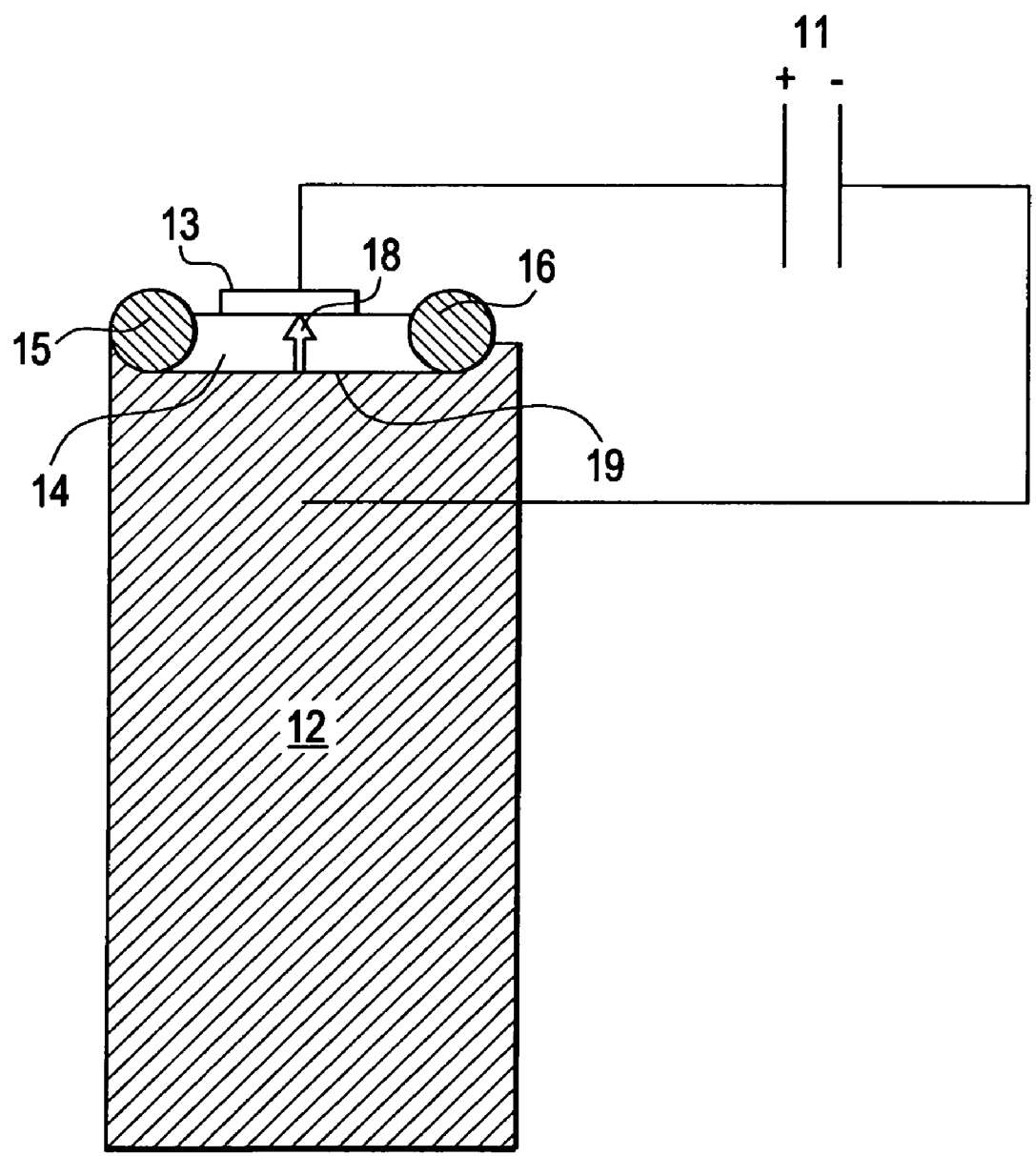
FIG. 2 shows a schematic in which oxygen is electrochemically pumped from the metallic component into the surrounding gas.

FIG. 2 depicts an exemplary auxiliary oxygen pump cell useful in this method. A pumping voltage (11) is applied to an oxygen pump cell with the metallic component 12 as the cathode of the oxygen pump cell. The oxygen pump cell is composed of electrolyte (14), the metallic component electrode 12, and an inert counter electrode 13. Seals 15 and 16 provide a non-conductive insulating layer. As the pumping voltage is applied 11, oxygen ions are produced and subsequently pumped out the metallic component through electrolyte 14 in the direction as indicated by white arrow 18. Flux direction of $0^{2-}$ is indicated by the arrow 19.

In another example, described herein are methods for diminishing or preventing the formation of volatile metal oxide formed in the fuel chamber of an SOFC or a chamber with low oxygen activity from a component composed of an oxide species by applying a positive protection potential to the component. In this example, the positive protection potential is sufficient to prevent or diminish the reduction of metal oxide species present in the component that produce volatile, partially reduced metal oxides that can ultimately react with an electrode (e.g., anode). The component can include, but is not limited to, a composite such as a ceramic or a metal containing one or more metal oxides. For example, when the component is a ceramic containing silicon dioxide, a positive protection potential can be applied to the component to prevent the reduction of silicon dioxide ($SiO_2$) to volatile silicon oxide (SiO). This can ultimately diminish or prevent anode poisoning.

In certain examples, the metallic component that can form volatile metal oxide can be coated with a protective layer that prevents or diminishes the migration of metal species to the surface. The ability of such protective layer to withstand high temperatures and harsh oxidizing environments is limited and can be enhanced by the use of a protective potential. When a protective layer is applied to the surface of the metallic component, the negative protection potential or oxygen pump voltage can be applied to the core of the metallic component to diminish or prevent formation of volatile metal oxides.

The methods described herein prevent or diminish the deposition of metal oxide on the electrode surface. In one example, the electrode is a SOFC cathode, an electrode in an electrochemical sensor, or an electrochemical cell for gas separation. In one example, the methods described herein are useful in reducing $Cr_2O_3$ deposition produced from chromium present in stainless steel or chromium containing alloys on the surfaces of a cathode in a SOFC.

EXPERIMENTAL

The methods described herein will now be discussed with specific reference to various examples. The following examples are not intended to be limiting of the invention and are rather provided as exemplary embodiments. Efforts have been made to ensure accuracy with respect to numbers (e.g., amounts, temperatures, etc.); however, some errors and deviations may have occurred. Unless indicated otherwise, parts are parts by weight, temperature is ° C. or is at ambient temperature, and pressure is at or near atmospheric.

I. Introduction

In the following examples, SOFC cathode performance was evaluated under various simulated SOFC operating conditions. The experimental observations were conducted on exemplary symmetric cathode/cathode single cell devices operated in air. Cathode polarization was simulated in these experiments by the application of a bias across the cathode/cathode single cell device. The exemplary single cell devices were composed of 3 Yttria-Stabilized Zirconia (YSZ) electrolyte and a porous electrode with $(La,Sr)MnO_3$/YSZ (LSM) cathode catalyst and (Ag,Pd)/3YSZ current collector layers deposited on both of its sides. A double set of leads was attached to the current collectors for use as biasing and sensing electrode contacts. The exemplary cells had average cell performance.

The baseline performance of the exemplary cells was first evaluated at 750° C. in air (Example 1). Electrochemical testing of the exemplary cells was then conducted with $Cr_2O_3$ powder (Example 2) as source for volatile Cr(VI)-oxide. Electrochemical testing of the exemplary cells was further conducted over a steel plate in order to mimic the effect of a steel frame, housing or tubing in a stack (Example 3). A slow flow of humidified air (bubbling dry air through water at room temperature) was lead through an alumina tubular furnace. Typical gas flow rates were in the range of 0.5-5 scfh. The steel plate was placed into the alumina tube in front and under the oxygen pump cell, so that the humidified gas was conducted first over the steel plate to pick up Cr(VI) oxide (oxyhydroxide) and then lead over the sample. For the electrochemical testing, a Solartron impedance analyzer was used. Impedance spectra were acquired in the frequency range from 0.1 to 300,000 Hz. Current-voltage characteristics were acquired in the range from −0.5V to +0.5V and current-time evolution was followed under various cathodic bias. As shown in Example 4, the steel plate was electrically charged and the cell performance was followed over time for various electric potentials. FIGS. 3-12 show experimental data under different operation conditions for an exemplary oxygen pump cell with LSM-based cathode in air at 750° C. with and without the application of a negative protection potential.

II. Processing Details for the Exemplary Oxygen Pump Samples a. Structure of the Oxygen Pump Cells For testing and monitoring the performance evolution of SOFC cathodes, cathode/cathode single cell devices were used. In the single cell, a thin sheet of 3YSZ electrolyte was sandwiched between two symmetric electrodes that were screen-printed on both sides of the 3YSZ electrolyte and fired. The electrodes had an LSM/YSZ catalyst layer and a Ag/YSZ current collector layer.

b. Processing of 3YSZ Electrolyte

Tosoh 3YSZ powder (TZ-3Y) was used as raw material for the electrolyte. A castable mixture was obtained by mixing 3YSZ powder with milling media, flocculent, plasticizer and binder. The slip was casted into a green tape on a support film, released from the support layer and fired on setters in air (box furnace). The standard firing cycle of the electrolyte went to a maximum temperature of 1430° C. with hold time 2 h. A fully dense, flexible sheet of about 20 μm thickness of tetragonal 3YSZ was obtained.

c. Processing of the LSM Catalyst Layer

Each of the various ink layers of the layered catalyst samples were printed with a DeHaart screen printer. The printing process was semi-automated with the exception of mounting the 3YSZ ceramic sheet. A print design was placed on the cloth covered mounting platen. Aligning to the dried print on the mounting platen provided the registration of the current print. Each substrate was printed and dried for several minutes at about 150° C., before printing the opposite side. All screens were made of 250 & 200-mesh stainless steel wire bonded to a frame.

Each printed substrate was dried and fired at an appropriate thermal cycle before printing the next layer. The first print layer was a cathode catalyst of 1 cm×1.5 cm printed area with LSM/YSZ ink and placed on both sides of the electrolyte with a 1 cm$^2$ area overlapping from the print on the opposite side. All ink formulations included an organic component as vehicle for the inorganic materials, which were composed of a higher complex alcohol as solvent, dispersant, and binder. The inks were composed of the inorganic powder and the organic vehicle. The LSM mixtures were pre-mixed on a three-roll mill followed by processing through an Eiger mill for optimal dispersion. The current collector inks were processed through the three-roll mill only. The current collector ink was composed of a silver/yttria-stabilized zirconia.

III. Electrochemical Characterization of Cathodes

Cathode impedance was measured in a symmetric two-electrode, four-wire set up. Impedance data were acquired with a Solartron system (1260 Frequency Response Analyzer/1287 Electrochemical Interface) with and without applied bias. The cells were tested within a protective alumina tube in a tubular furnace under gas flow. The active electrode area was 1 cm$^2$. The frequency was varied from 300000 Hz to 10 mHz. The amplitude applied between working and reference electrode was 30 mV. 10 points per decade of frequency were measured while scanning from the highest to the lowest frequency. Bulk, grain boundary and electrode contributions to the impedance were fitted by an equivalent circuit having a parallel resistor and constant phase element for each observed arc. Constant phase elements were used in the modeling instead of simple capacitors because these phase elements better describe the real system with its depressed arcs.

Current-voltage characteristics were acquired at different stages of aging or exposure time to a Cr-source. Performance degradation of the cathodes was followed as function of time by acquiring the current density over time.

To mimic the polarization a cathode suffers in an operating SOFC, a cathodic bias was applied to the cathode in the oxygen pump cell. The bias was chosen to be larger than that usually experienced by a cathode in a regular SOFC operation. In most experiments a cathodic bias of −0.2V or −0.3V was used.

IV. Source of Cr-Poisoning 446 steel was used as a representative steel that acts at high temperature in air as source of volatile Cr(VI) oxide and/or oxy-hydroxide.

V. Exemplary Experiments a. Experiments with Electrically Charged Steel Plate

In the following experiments, a potential difference was applied between the steel plate and the biased (polarized) cathode or between steel plate and ground. A DC power supply was used, and the steel plate was set on the negative potential. Electrical potential differences from 0V to −1.2V (and for illustration also positive potentials) were used.

The electric charge state of the steel plate affected oxidation. A negative charge was observed to slow down the oxidation of the steel. The plate showed after many hours in air only a bluish shine of oxidation compared to an uncharged steel that showed a thick oxidation layer. Response of the cathode degradation to the applied charge is reported in Example 4.

b. Prophetic-Experiments with Steel Plate at Electrochemically Imposed Reduced State In another set of experiments a reduced condition can be imposed on the steel plate by electrochemical pumping with help of an applied voltage from the steel through an oxygen ion electrolyte to an auxiliary inert electrode that can be held in air. The applied voltage can lower the oxygen chemical potential in the steel plate.

Example 1

Performance of Unpolarized and Polarized Cathodes in Absence of a Cr-Source

The baseline performance of an exemplary single cell device with LSM-based electrodes is illustrated by the impedance spectrum of the non-biased cell, i-V characteristics of the cell, impedance spectrum of the cell under cathodic bias of −0.3 V, and the i-t curve of the cell under bias −0.3 V (FIGS. 3-6).

Figure 3:
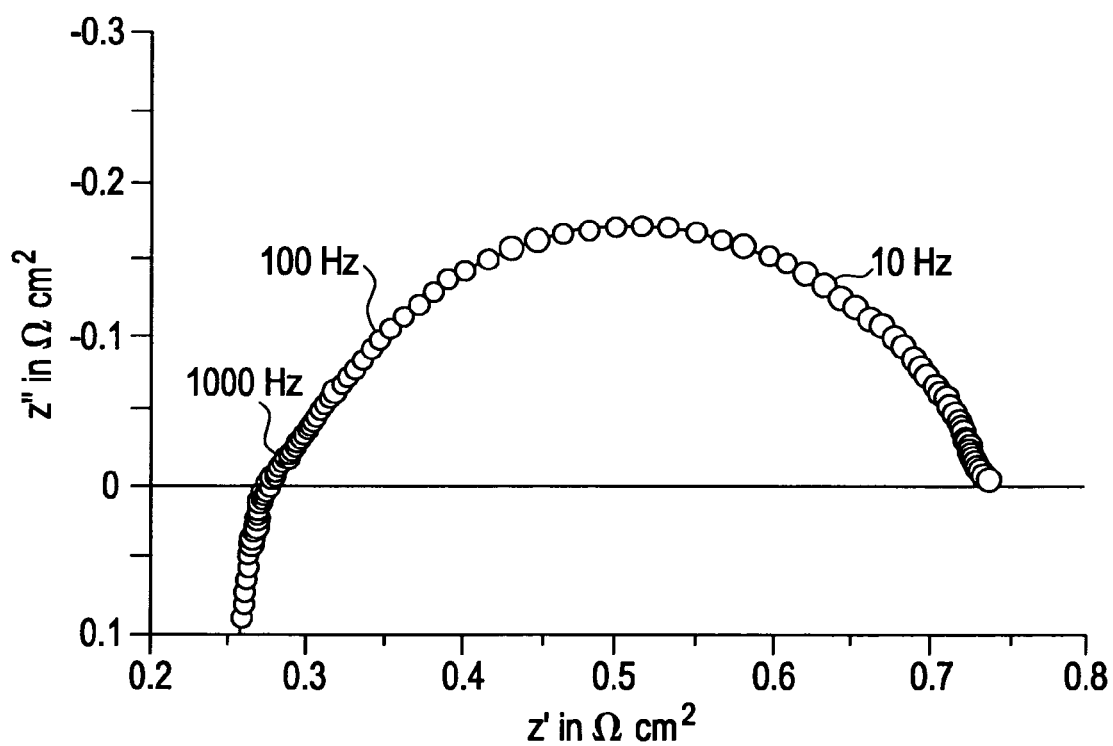
FIG. 3 shows impedance data of an exemplary symmetric single cell device for the case of unpolarized cathode (bias 0V); no Cr(VI)-oxide; or Cr(VI) oxy-hydroxide vapor.

FIG. 3 shows the impedance of an exemplary single cell device with LSM-based electrodes at 750° C. under humidified air flow for the unpolarized cathode (bias 0V) in an environment free of any chromium metal species or volatile Cr(VI)-species.

Figure 4:
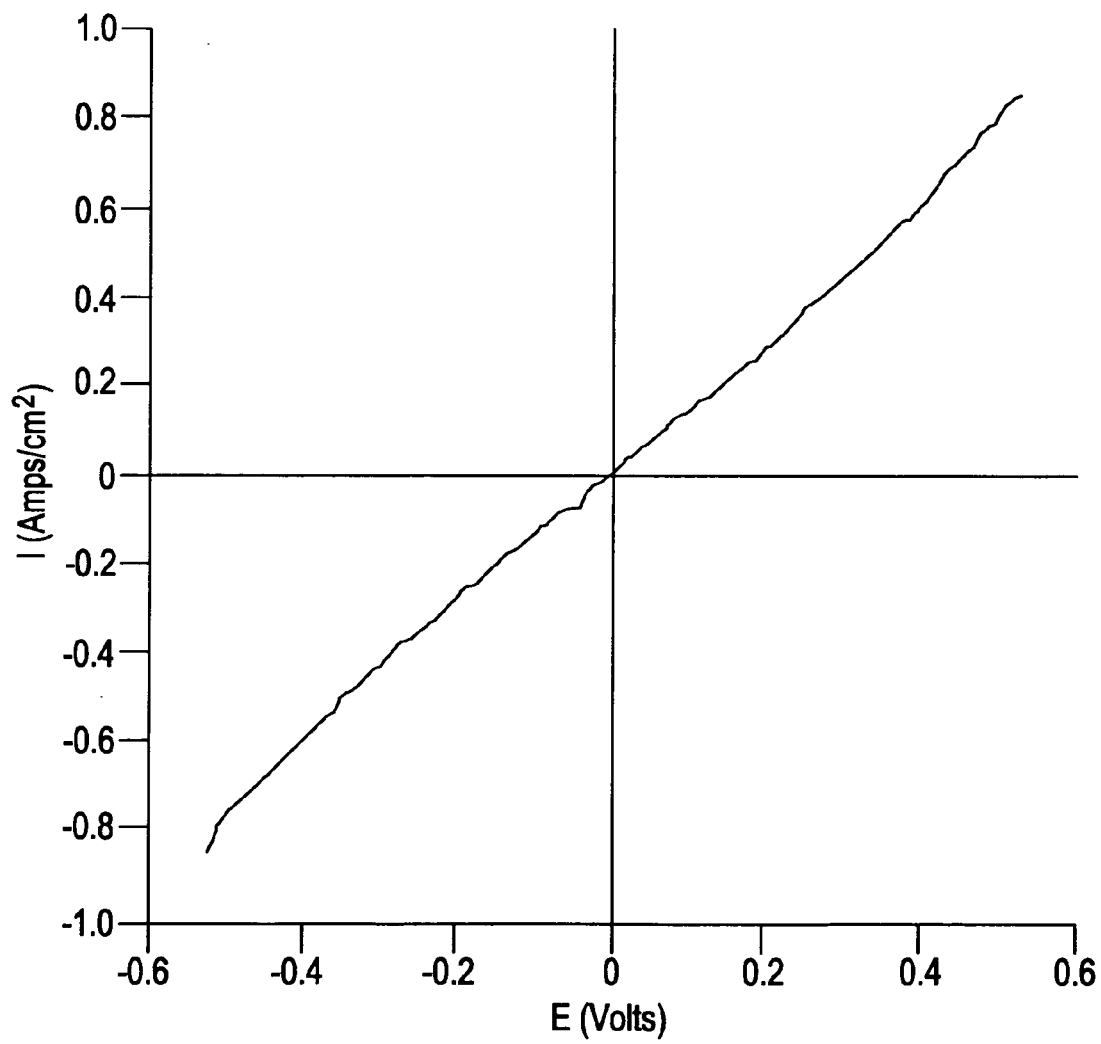
FIG. 4 shows the current—voltage characteristics of an exemplary symmetric single cell device; no Cr(VI)-oxide; or Cr(VI) oxy-hydroxide vapor.

FIG. 4 shows the current—voltage characteristics of an exemplary single cell device with LSM-based electrodes at 750° C. under humidified air flow in an environment free of any chromium metal species or volatile Cr(VI)-species.

Figure 5:
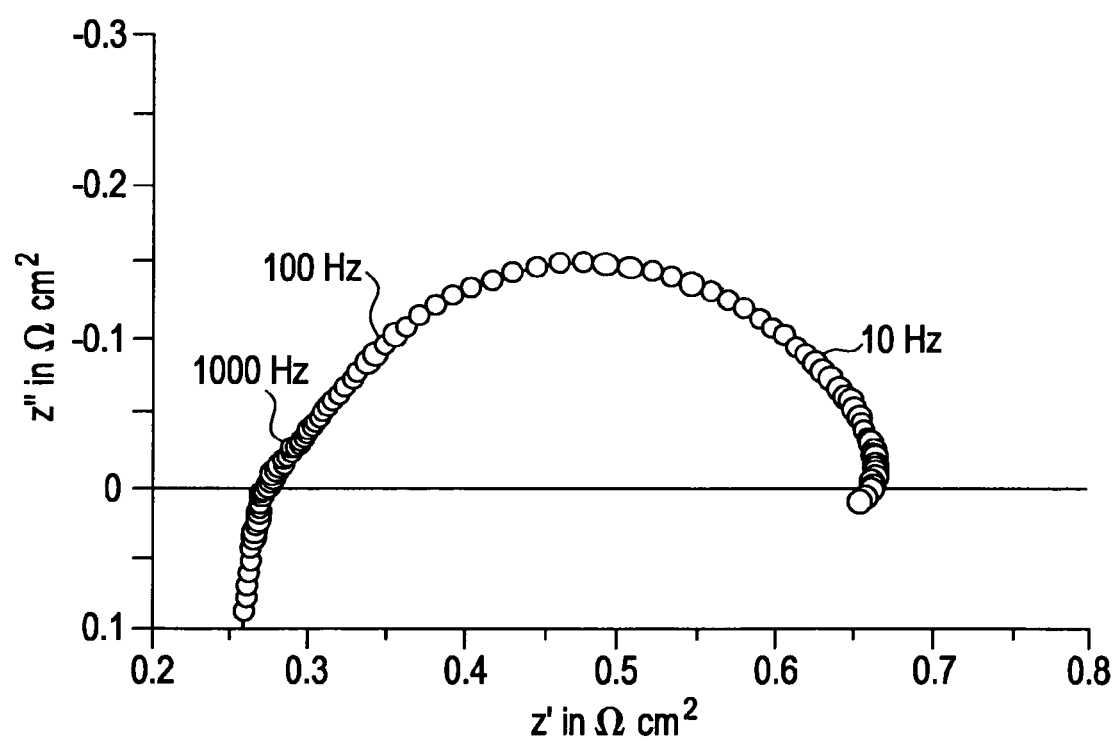
FIG. 5 shows impedance of an exemplary symmetric single cell device for the polarized cathode (bias −0.3V); no Cr(VI)-oxide; or Cr(VI) oxy-hydroxide vapor.

FIG. 5 shows the impedance of an exemplary single cell device with LSM-based electrodes at 750° C. in humidified air flow for the polarized cathode under cathodic bias −0.3V in an environment free of chromium metal species or volatile Cr(VI)-species.

Figure 6:
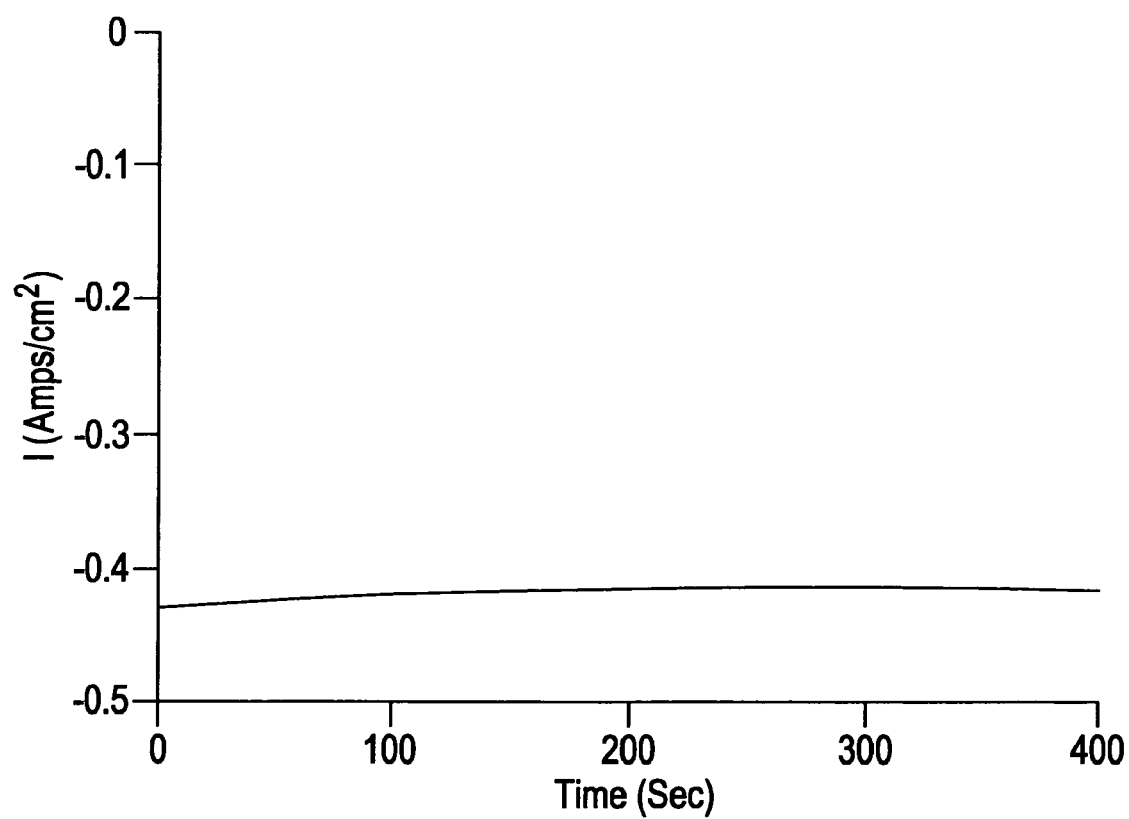
FIG. 6 shows the current density evolution over time of an exemplary symmetric single cell device under bias.

FIG. 6 demonstrates the performance of an exemplary single cell device with LSM-based electrodes by presenting the current density under applied bias as function time at 750° C. in humidified air flow in an environment free of chromium metal species or volatile Cr(VI)-species. The applied cell bias was −0.3V.

Example 2

Figure 7B:
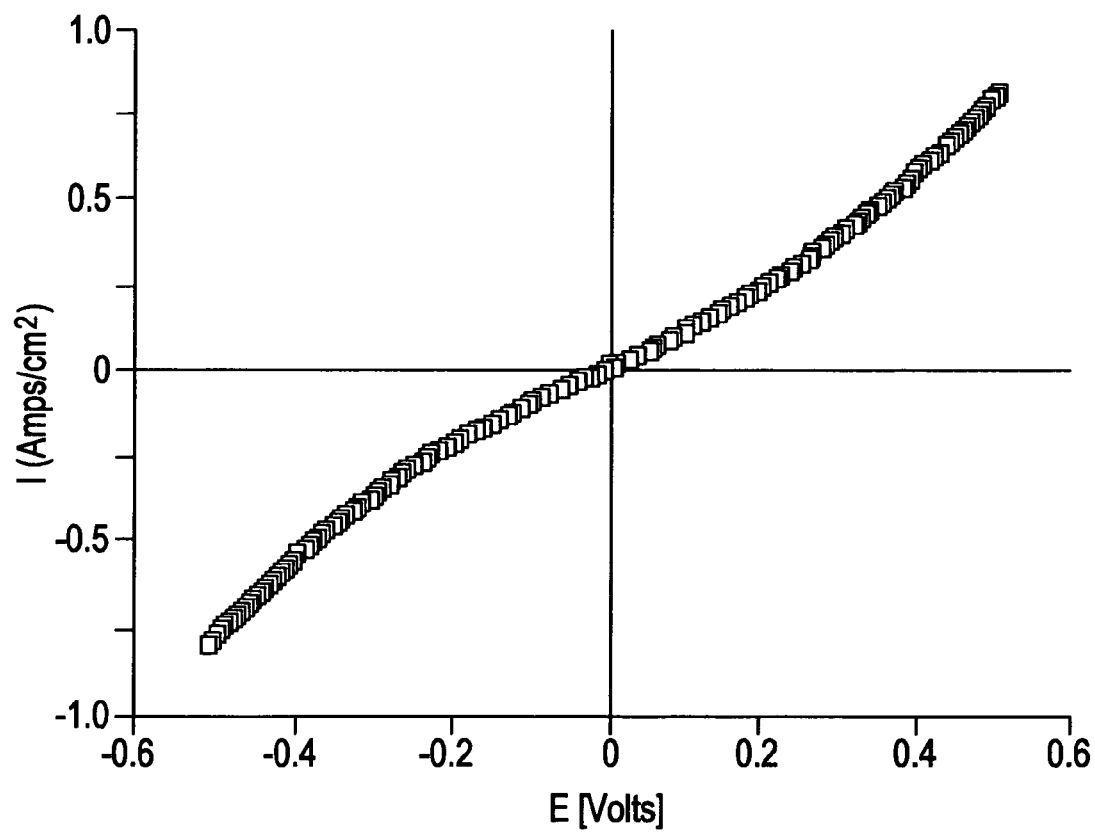

Performance of Unpolarized and Polarized Cathodes in the Presence of $Cr_2O_3$ Powder as Cr-Source Unpolarized cathode: FIGS. 7A and 7B show the cathode impedance and current density of an exemplary single cell device with LSM-based electrodes as a function of applied potential for a cell exposed to a Cr(VI)oxide/-oxyhydroxide vapor source ($Cr_2O_3$ powder bed under humid air flow) at 750° C. The cathode performance degradation remained relatively small over long time after an initial stabilization period as long as no bias (cathode polarization) was applied.

Figure 8A:
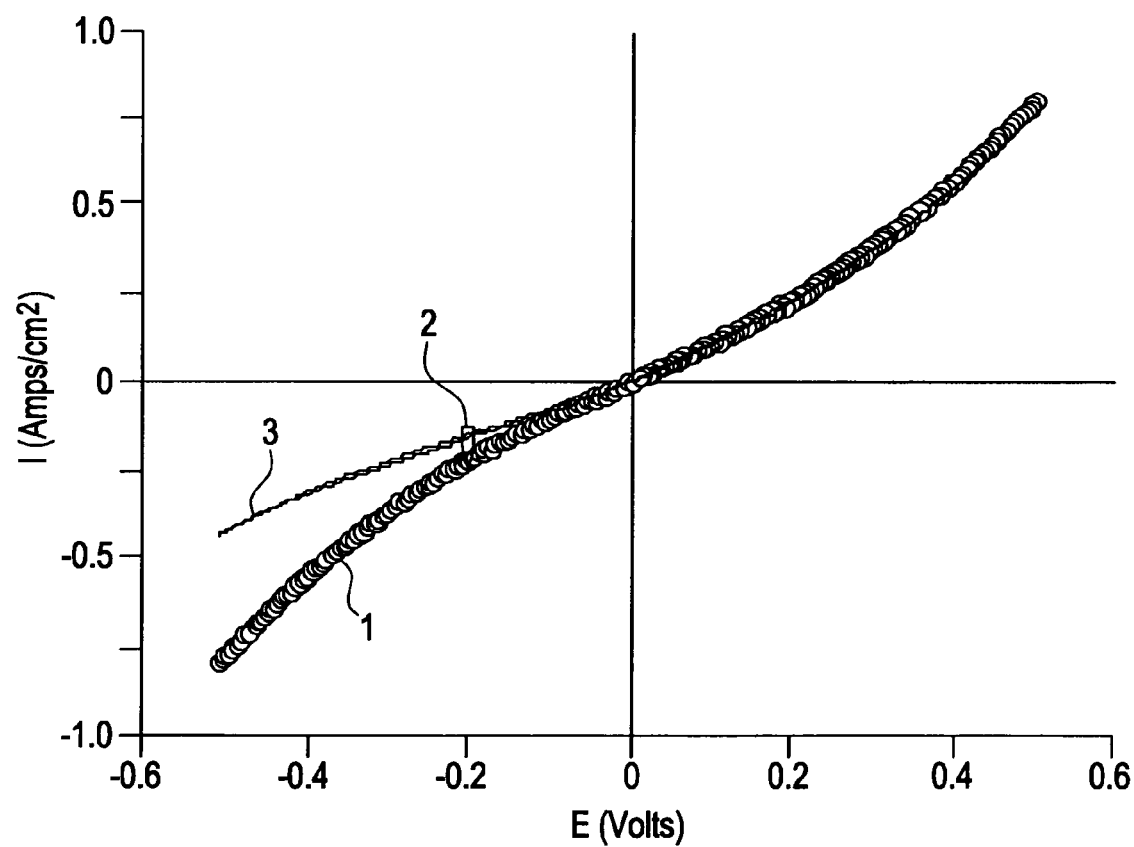
FIGS. 8A and 8B show an exemplary symmetric single cell device, the current-voltage characteristics, and current density evolution as function of time under applied bias when exposed to $Cr_2O_3$ as Cr(VI)oxide/-oxyhydroxide vapor source.
Figure 8B:
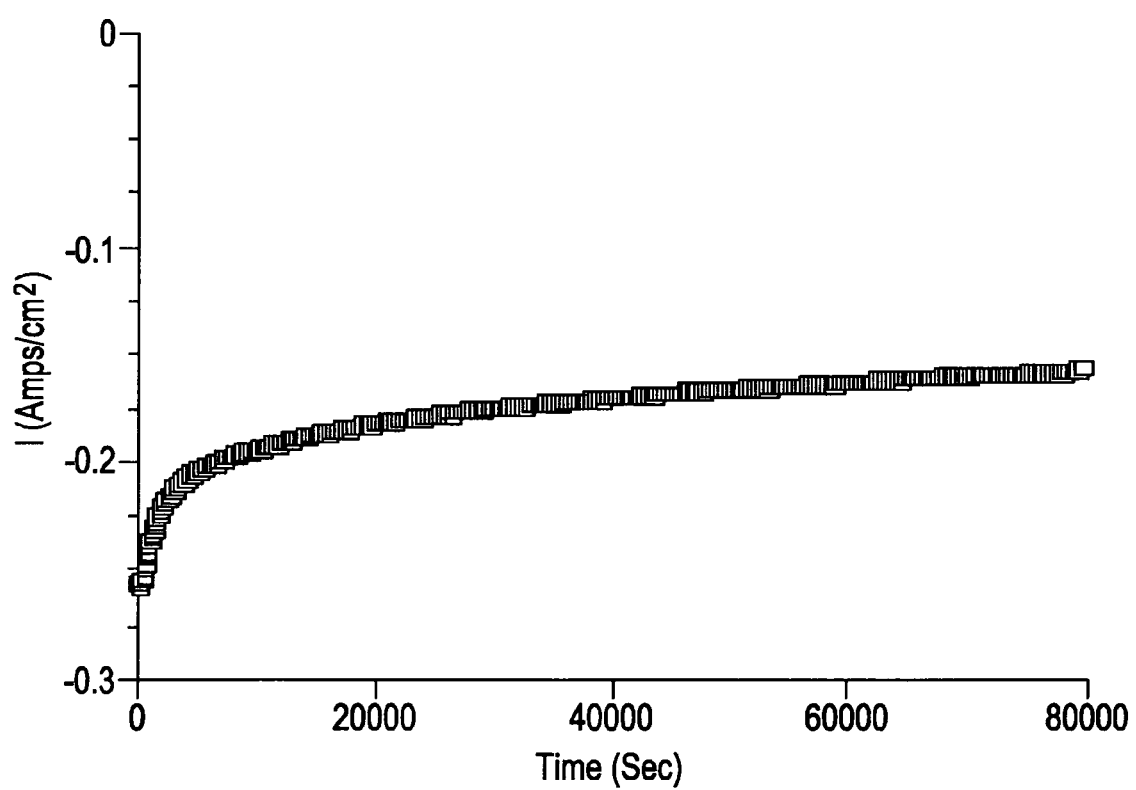

Polarized cathode: Under imitated cathode polarization by application of a cathodic bias, significant performance loss was observed for the exemplary single cell device with LSM-based electrodes. This performance loss was due to the well-known chromium poisoning of the cathode. FIGS. 8A and 8B illustrate the performance of the exemplary cathode/cathode cells that were exposed to volatile Cr(VI)-oxide (or mixed oxy-hydroxide) formed by a $Cr_2O_3$ powder source under bias. The cathodic bias was used to simulate the cathode polarization in an operating SOFC. FIG. 8A shows the i-V characteristics prior (I) and after (III) bias application. FIG. 8B shows the loss in current density as function of time under applied bias of −0.2V.

Example 3

Figure 9:
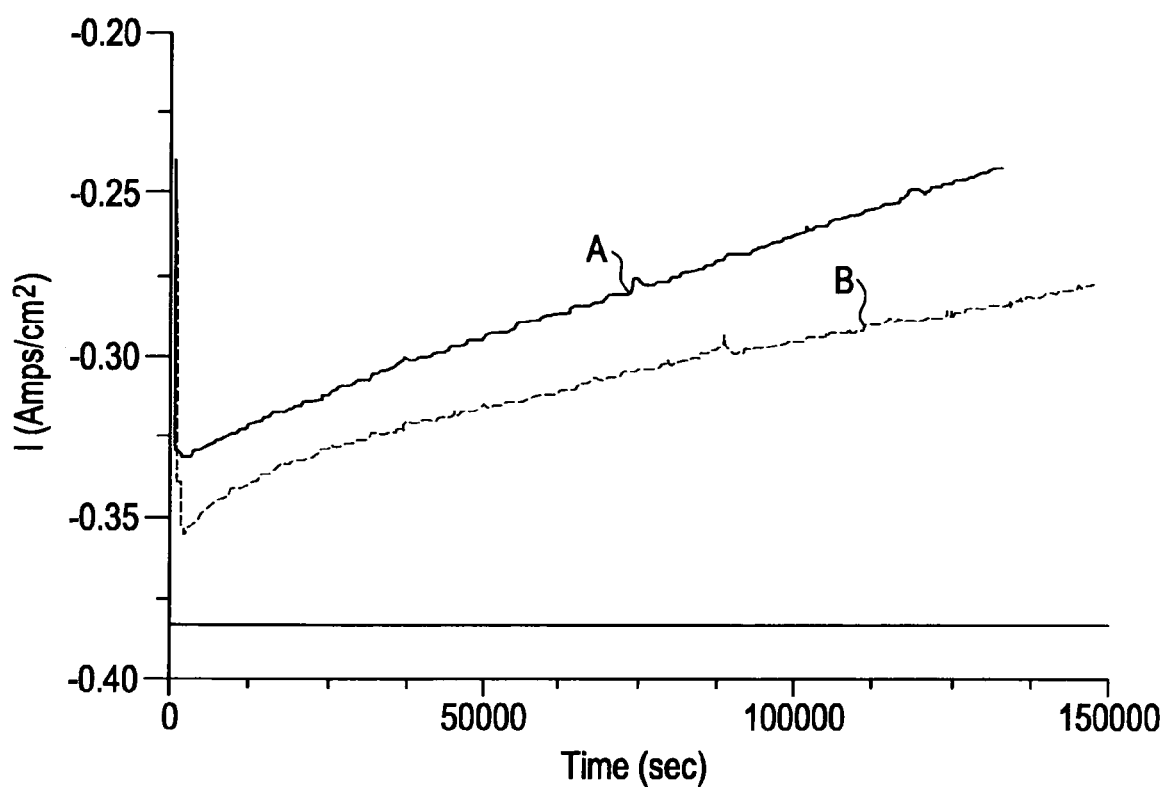
FIG. 9 shows performance loss under cathode polarization (simulated by −0.3V cathodic bias) of an exemplary symmetric single cell device when exposed to steel without any protective potential (A) and with a protective potential (B).

Performance of Polarized Cathodes in the Presence of Cr-Containing Steel as Cr-Source Using a 446 steel plate as source of volatile Cr(VI) species, significant performance loss was once again observed for an exemplary single cell device with LSM-based electrodes when cathodic bias was applied. FIG. 9 shows in curve A the performance loss in the form of current density—time evolution for an applied cathodic bias of −0.3V. The cathode pump cell was operated in humidified air at 750° C. The cathodic bias was used to simulate the polarization experienced by the cathode during SOFC operation. After exposure to (humidified) air at 750° C. for several days, the 446 steel plate showed a thick brown-blackish corrosion scale.

Example 4

Decrease of Chromium Poisoning-Related Cathode Performance Loss by Application of Protection Potential to Cr-Containing Steel or Other Cr-Containing Metallic Components Using an exemplary single cell device with LSM-based electrodes as described above, the performance loss of the polarized (cathodically biased) cathode that is exposed to a Cr-containing steel or alloy as a source of volatile Cr(VI) oxide or oxy-hydroxide can be affected by applying a potential to the Cr-containing metallic component.

With a protective potential of −1V applied between the 446 steel plate and the grounded SOFC cathode, the 446 steel plate after exposure to (humidified) air at 750° C. for several days did not show the typical thick brown-blackish corrosion scale, but only a bluish shiny surface.

With the 446 steel plate as source of volatile Cr(VI) oxide/hydroxyl-oxide, the performance loss of the single cell device with LSM-based electrodes with −0.3V cathodic bias was compared for exposure to the steel plate without any protective potential (A) and for exposure to a steel plate, to which a protective negative potential was applied (B) (FIG. 9). The protective potential was −1V and applied between the surface of the as-machined steel plate and the cathode of the single cell device. FIG. 9 illustrates the performance loss in form of a current density-time evolution for an applied cathodic bias of −0.3V. Biasing the cathode was used to simulate in an exemplary single cell device with two symmetric LSM-based cathodes the polarization a cathode would suffer during regular SOFC operation. The performance loss of the cell for which a protective potential was applied to the steel was lesser.

Figure 10:
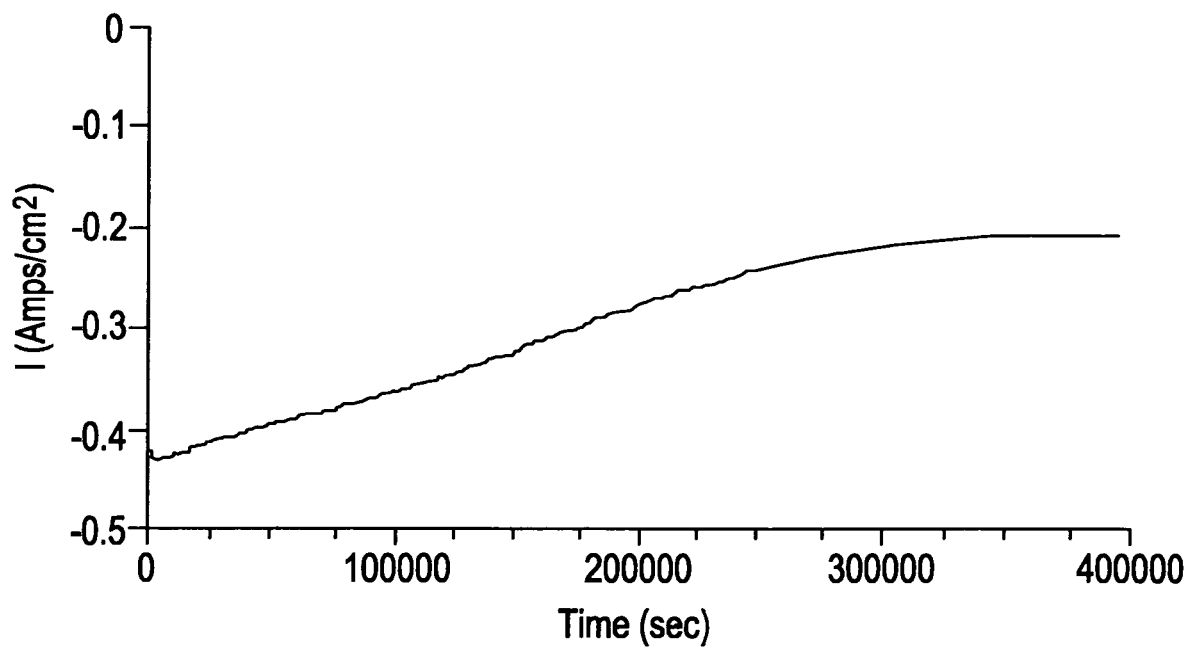
FIG. 10 shows the time evolution of the current density of a biased exemplary symmetric single cell device for different settings of the protective potential.

FIG. 10 shows the evolution of the current density of an exemplary single cell device with LSM-based electrodes at 750° C. in humidified air flow for the polarized cathode biased at −0.3V in presence of a steel plate (446) that was set to a negative protection potential of −0.3V relative to the cathode. In an early time range, an almost linear degradation occurred with rate $7.5\times10^{-7}$ $A/cm^2s$ that in a late stage decreased.

Figure 11:
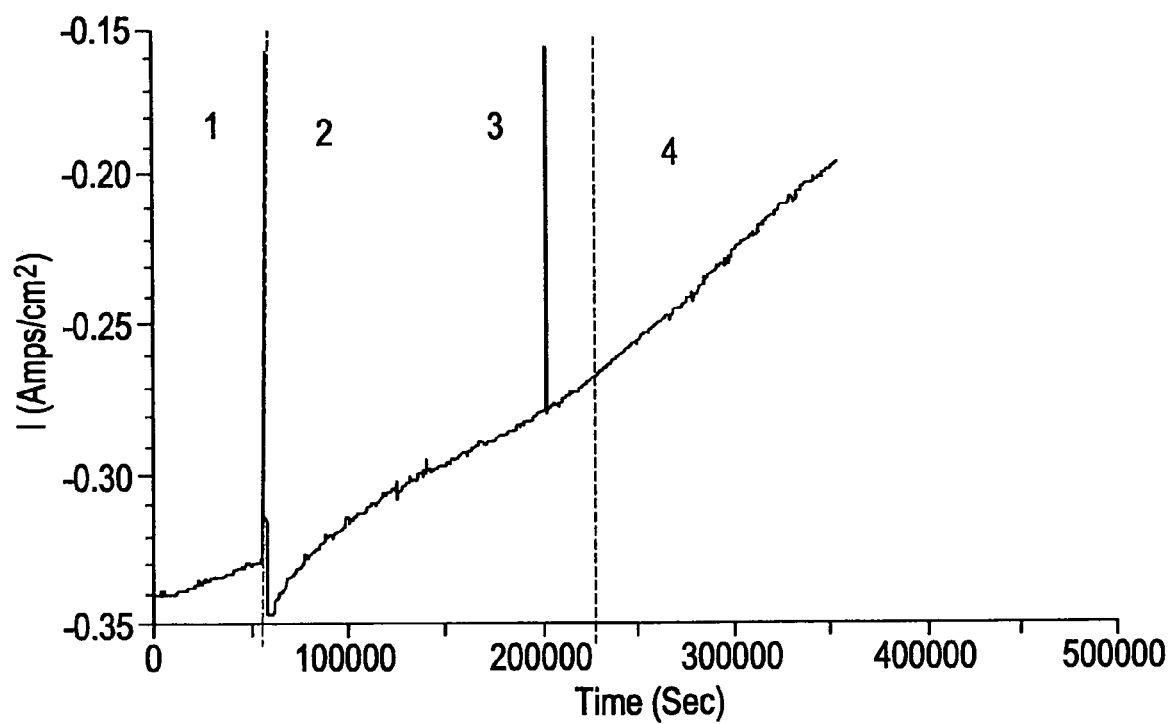
FIG. 11 shows current density evolution of a biased exemplary symmetric single cell device under various protection potentials.

FIG. 11 shows the current density evolution with time of the single cell device with LSM-based electrodes at 750° C. in humidified air flow at a cathodic bias of −0.3V (region I from t=0 s to t=60,000 s). At t=60,000 s, a Cr-containing steel plate was introduced in the furnace, where the steel plate was set at potential −1.2V at 60,000 s. In transition region II, which was characterized by a spike when the cold steel plate was introduced in the furnace, the thin oxidation layer of the superficially oxidized steel plate (that was only roughly polished and not specifically treated against oxidation) yielded formation of Cr(VI) vapor and induced a fast degradation. Degradation was then slowed down and stabilized once the steel adopts its negative potential and the associated surface chemistry. A steady state of degradation rate was adopted for the applied potential −1.2V in region III. The degradation rate was close to that observed for the cell in absence of chromium-source in region I. The potential was then changed again to −0.6V in region IV. Changes in degradation rate were noticed, where the degradation accelerated at lower protection potentials.

Figure 12:
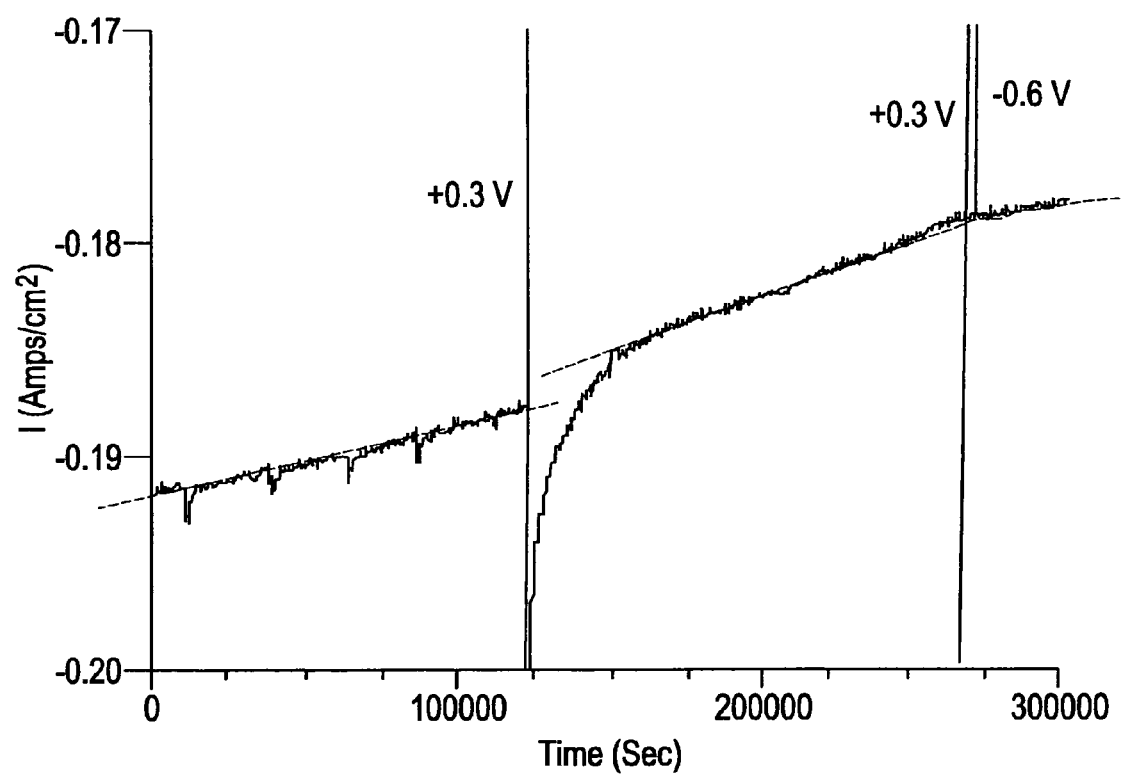
FIG. 12 shows changes in degradation rate(s) of an exemplary symmetric single cell device with an external potential applied to the steel plate.

FIG. 12 shows the current density evolution with time of the single cell devices with LSM-based electrodes at 750° C. in humidified air flow after an initial degradation of 10 days at cathodic bias of −0.3V in the presence of a Cr-containing steel plate. FIG. 12 illustrates the changes in degradation rate when an external potential that was applied to the steel plate. FIG. 12 shows current density evolutions for potential settings of −0.3V, +0.3V and −0.6V for the steel plate. Even at such late degradation stage, large changes in degradation rate were noticed. The degradation rates were $3\times10^{-8}$ $A/cm^2s$ at potential −0.3V, $5\times10^{-8}$ $A/cm^2s$ at +0.3V and $1.5\times10^{-8}$ $A/cm^2s$ at −0.6V. This showed that not only in early, but also in late degradation stages the degradation rate can be slowed down by application of a negative potential to the steel plate.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed:

1. A method for diminishing or preventing the deposition of a metal oxide on an electrode surface present in a system, the metal oxide formed by a metal species present in a metallic component, wherein the method comprises applying a negative protection potential to the metallic component during system operation.

2. A method for diminishing or preventing the deposition of a metal oxide on an electrode surface present in a SOFC system, the metal oxide formed by a metal species present in a metallic component, wherein the method comprises applying a negative protection potential to the metallic component, wherein the negative protection potential is applied between the metallic component and a cathode.

3. The method of claim 2, wherein the negative protection potential applied between metallic component and a cathode having the lowest potential in the system is at least −0.3 V.

4. The method of claim 2, wherein the negative protection potential applied between metallic component and a cathode having the lowest potential in the system is at least −0.5 V.

5. The method of claim 2, wherein the negative protection potential applied between metallic component and a cathode having the lowest potential in the system is at least −0.8 V.

6. The method of claim 2, wherein the negative protection potential is applied homogeneously to every metallic component.

7. The method of claim 2, wherein the metallic component comprises a metal frame for supporting a device or circuit of devices, a gas inlet tube, or a metal casing.

8. The method of claim 2, wherein the metallic component comprises steel, stainless steel, or an alloy.

9. The method of claim 2, wherein the metal species comprises an element that forms a simple or mixed volatile oxide.

10. The method of claim 2, wherein the metal species comprises chromium, tungsten, molybdenum, any combination thereof.

11. A method for diminishing or preventing the deposition of a metal oxide on an electrode surface present in a system, the metal oxide formed by a metal species present in a metallic component, wherein the method comprises applying a negative protection potential to the metallic component during system operation, wherein the electrode comprises a SOFC cathode, an electrode in electrochemical sensor, or an electrochemical cell for gas separation.

12. The method of claim 2, wherein when the metallic component comprises a protective layer, the negative protective potential is applied to the core of the metallic component.

13. The method of claim 2, wherein the method diminishes or prevents deposition of $Cr_2O_3$ or its mixed oxide on the surface of a cathode in a solid oxide fuel cell, wherein the method comprises applying a negative protective potential to all metal components present in the fuel cell, wherein the metallic components comprise chromium.

14. The method of claim 13, wherein the metallic component comprises stainless steel.

15. A method for diminishing the amount of oxygen present in a metallic component with the use of an auxiliary electrochemical oxygen pump cell, wherein the metallic component is an electrode in the oxygen pump cell, the method comprising (a) applying an oxygen pump voltage to the metallic component to reduce the oxygen chemical potential in the metallic component, and (b) removing oxygen from the metallic component.

16. The method of claim 15, wherein the metallic component comprises stainless steel, steel or a chromium-containing alloy.

17. The method of claim 15, wherein the metal species comprises chromium.

18. The method of claim 15, wherein the oxygen pump cell comprises an ion conducting electrolyte and an inert auxiliary counter electrode, wherein the pump cell is sealed on the side of the metallic component, and the metallic component is the cathode of the oxygen pump cell.

19. The method of claim 18, wherein the ion conducting electrolyte comprises yttria-stabilized zirconia (YSZ).

20. The method of claim 15, wherein the oxygen pump voltage is applied continuously to the electrode of the oxygen pump cell.

21. A method for diminishing or preventing electrode poisoning by a volatile oxide formed from a component comprising an oxide species present in a fuel chamber or reducing environment comprising applying a positive protection potential to the component.

22. The method of claim 21, wherein the component comprises a ceramic component.

23. The method of claim 21, wherein the method diminishes or prevents poisoning of an anode by volatile SiO.

24. The method of claim 1 wherein the system operating temperature is at least 750° C.

* * * * *